United States Patent
Vlot et al.

(10) Patent No.: US 6,182,209 B1
(45) Date of Patent: Jan. 30, 2001

(54) DATA PROCESSING DEVICE WITH RELATIVE JUMP INSTRUCTION

(75) Inventors: Marnix C. Vlot; Paul E. R. Lippens, both of Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/135,490

(22) Filed: Aug. 17, 1998

(30) Foreign Application Priority Data

Aug. 18, 1997 (EP) .................................................. 97202530

(51) Int. Cl.⁷ .......................................................... G06F 9/32
(52) U.S. Cl. ............................................. 712/233; 712/230
(58) Field of Search ........................... 712/7, 228, 230, 712/224, 223

(56) References Cited

U.S. PATENT DOCUMENTS

| | | | | |
|---|---|---|---|---|
| 5,008,807 | * | 4/1991 | Krueger | 712/213 |
| 5,349,391 | * | 9/1994 | Vlot | 348/705 |
| 5,367,705 | * | 11/1994 | Sites | 712/41 |
| 5,434,628 | * | 7/1995 | Spiero | 348/705 |
| 5,594,733 | * | 1/1997 | Vlot | 370/499 |
| 5,613,152 | * | 3/1997 | Van Meerbergen | 712/23 |
| 5,644,699 | * | 7/1997 | Yoshida | 714/7 |
| 5,649,145 | * | 7/1997 | Matsuo | 711/213 |
| 5,689,507 | * | 11/1997 | Bloks | 370/389 |
| 5,787,090 | * | 7/1998 | Van Niekerk | 711/206 |
| 5,812,811 | * | 9/1998 | Dubey | 712/216 |
| 5,895,500 | * | 4/1999 | Thomason | 711/206 |

FOREIGN PATENT DOCUMENTS

04037932 * 2/1992 (JP) .

OTHER PUBLICATIONS

Philips Semiconductor Data Book, IC25, 1996; pp. 33–56.

* cited by examiner

Primary Examiner—Eric Coleman

(57) ABSTRACT

In an instruction a relative jump distance is expressed as a number of instructions rather than as a number of addresses. Instructions have various lengths. After encountering the instruction the processing device loads the following instructions but suppresses execution of a set of instructions that consists of the number of instructions expressed in the relative jump instruction.

17 Claims, 1 Drawing Sheet

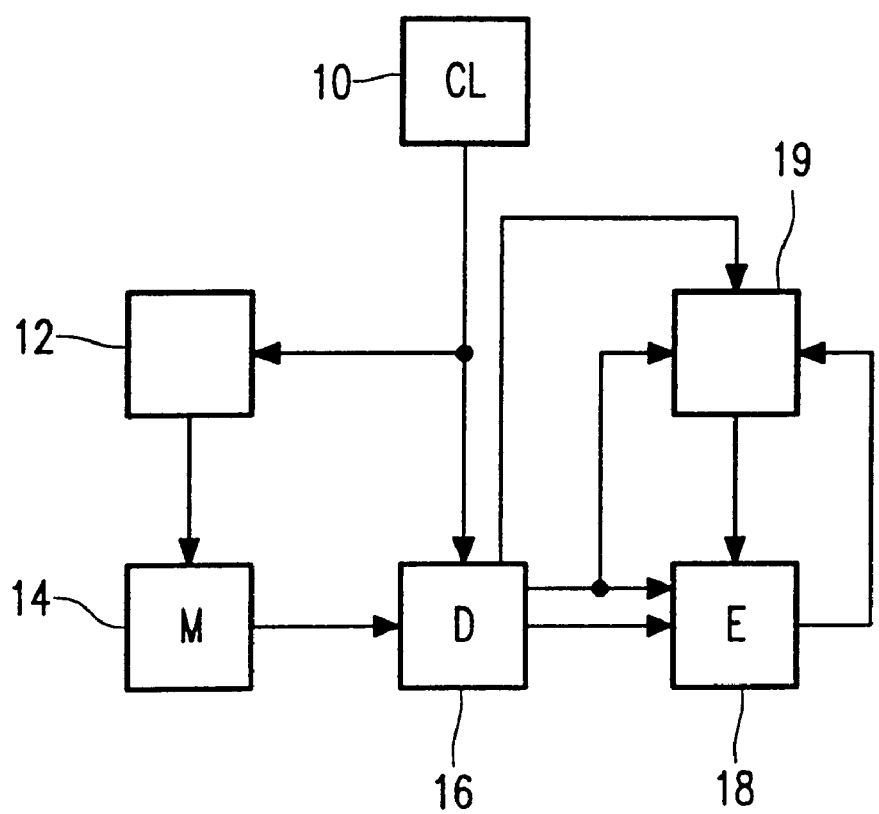

DATA PROCESSING DEVICE WITH RELATIVE JUMP INSTRUCTION

BACKGROUND OF THE INVENTION

The invention relates to a data processing device. A data processing device is described in the architectural overview of the Philips 80C51XA processor, published in the "1996 Data handbook" IC25 published by Philips Semiconductors, pages 33 to 56.

It is desirable to minimize the amount of memory space needed for storing the instructions from a program for such a processing device. A reduction of the amount of memory space can be realized by using an instruction set with instructions of various lengths, e.g. 8, 16 or 24 bits, the most frequently occurring instructions being coded with the shortest length.

SUMMARY OF THE INVENTION

It is an object of the invention to provide for a data processing device in which the amount of memory space needed for storing instructions can be further reduced.

The invention provides for a data processing device according to claim 1. By expressing the jump distance in terms of the number of instructions to be jumped over, instead of in terms of the number of memory addresses to be jumped over as in the prior art, a given range of relevant jump distances can be expressed with a smaller number of bits. For example, using a two bit coding, four different jump distances can be expressed using numbers of instructions, whereas using memory addresses this would require three bits on average, if one assumes an average of two addresses per instruction.

Instead of the length of the set of instructions (the number of addresses it occupies) that the device must jump over, the cardinal number of this set, i.e. the number of instructions in this set is specified in the instruction. Because the instruction set contains instructions of various lengths, e.g. some 8 bit long, some 12 bit long, some 16 bit long etc., the length of the set of instructions that the device must jump of over is not fixed. As a result, the address of the first instruction following the relative jump instruction that has to be executed can only be determined if the length of the set of intervening instructions is determined. For this reason, the instruction execution unit still reads the intervening instructions, but it does not execute these intervening instructions. Of course, this may make the execution of a relative jump instruction expressed in a number of instructions slower than that of a relative jump instructions expressed in a number of memory addresses (because in the latter case, the intervening instructions need not be read). However, it has been found that in typical programs many jumps jump over only a few instructions. For such jumps the loss of speed is very small. Moreover, a processing device which expresses jump distance in terms of memory addresses often will not realize its greater speed anyway because of disruption of pipelining caused by the jump instruction.

An embodiment of the data processing device according to the invention is an instruction execution pipeline with a decoding stage and an execution stage operating in parallel for successive instructions, disabling the execution stage following execution of the instance for a number of instruction execution cycles corresponding to the jump distance. In this way the jump instruction does not interrupt pipeline flow and no branch prediction is needed.

Another embodiment of the data processing device according to the invention is the relative jump instruction being a conditional relative jump instruction specifying a condition, the instruction execution unit excepts the set of instructions from execution when this condition is met, and the instruction execution unit executes the set of instructions when said condition is not met. This provides for conditional jump instructions.

Another embodiment of the data processing device according to the invention is the instruction execution unit interprets each possible contents of the field as expressing a respective number of instructions that is greater than zero. A jump of zero instructions is effectively no jump at all. Instruction space is saved, or alternatively the jump range is extended by not providing for the coding of jumps of zero instructions.

BRIEF DESCRIPTION OF THE DRAWINGS

These and other advantageous aspects of the invention will be described in a non-limitative way using the following figure.

FIG. 1 shows a data processing apparatus

DETAILED DESCRIPTION OF THE PREFERRED EMBODIMENT

FIG. 1 shows a data processing apparatus. The apparatus contains a clock 10 coupled to a memory address counter 12, which in turn is coupled to an address input of a memory 14. An output of the memory 14 is coupled to an instruction decoding unit 16. The instruction decoding unit has a clock input coupled to the clock 10 and an command output, a command clock output and a jump distance output. The command output and the command clock output are coupled to an execution stage 18. The apparatus also contains a jump counter 16, which has a clock input coupled to the command clock output, a data input coupled to the jump distance output and a load input coupled to the execution stage 18. The jump counter 16 has an output coupled to an enable input of the execution stage 18.

In operation the content of the memory address counter is periodically incremented and addresses successive locations in memory 14. The memory 14 contains instructions for the instruction decoding unit 16. The instructions have various lengths, for example various multiples of four bits. As a rule, instructions will be longer if they are used less frequently. Thus, the amount of memory needed for storing instructions is smaller on average than would be needed if all instructions had the same length.

Instructions stored in the successive locations are transmitted to decoding unit 16. The decoding unit 16 can decode instructions of various lengths. Thus each instruction may be stored in one or more locations and may be transmitted in one or more cycles of the clock 10. When the instruction decoding unit 16 receives one or more successive parts of an instruction from memory 14 it determines whether the instruction is complete or whether more is to follow. The instruction decoding unit 16 decodes the instruction into a command. When the command is ready for execution, the instruction decoding unit 16 starts a new command execution cycle by transmitting a command signal identifying the command to the execution stage 18, together with a command clock signal which signals the start of the command cycle. The command is then executed by the execution stage 18.

The execution stage 18, the instruction decoding unit 16 and the memory may operate as a pipeline: the instruction decoding unit 16 may start decoding an instruction at the same time when the execution stage 18 is, or starts, executing the command derived from a preceding instruction and the memory fetches, or starts fetching a next instruction. In this case the instruction and the command are kept in pipeline registers. However, other ways of operating, for example one where the instruction decoder starts decoding the next instruction only when the present instruction has been executed are also compatible with the invention.

The instruction set contains a relative jump instruction with a field expressing the jump distance as a number of instructions to be jumped. Upon encountering such an instruction the instruction decoding unit 16 supplies the field to the jump counter 19 and commands that this field is loaded into the jump counter 19. Thereupon, the jump counter 19 disables the execution stage 18 for a number of command cycles. Each time the instruction decoding unit 16 signals the start of a command cycle, the content of the jump counter 19 is decremented. When the jump counter 19 drops below zero, the jump counter 19 stops disabling the execution stage 18 so that the execution stage 18 is enabled to execute the subsequent commands. Thus the data processing apparatus suppresses execution of a number of instructions, the number being determined by the content of a field in the relative jump instruction.

The field used for indicating the jump distance may be relatively short, for example only two bits. In this way four different jump distances can be coded. It has been found that this small collection of jump distances suffices for most jumps in often used programs. By using such a short field instructions will be very compact and will take up little storage space.

When the content of the field is 00, 01, 10 or 11 for example one, two three or four instructions respectively are not executed following the relative jump instruction. It should be noted that each of the four possible values indicates a different non-zero number of instructions to be jumped over. The way the instruction is coded leaves no possibility for indicating a jump of zero instructions. Thus a maximum number of relevant jump distances can be coded with the two bits in the field. Clearly a maximum number of relevant jump distances can also be obtained by coding only non-zero jumps in case the field contains n-bits (n=3,4 etc.).

In an alternative embodiment at least one of the possible contents of the field is used to indicate that the instruction is extended with an address indicating the jump distance in terms of addresses instead of in terms of instructions. For example, when the content of the field is 00, 01 or 10, one two or three instructions are not executed following the relative jump instruction, but when the content of the field is 11, the instruction is followed by jump distance information D. When the instruction decoder 16 detects a relative jump instruction in which the content of the field is 11, the instruction decoder 16 reads the jump distance information D as part of the instruction and adds the jump distance information D to the value of the program counter. In this way a jump expressed in terms of addresses is executed. Of course, the instruction may specify an absolute jump instead (in which case D is loaded into the program counter), or either an absolute jump or a relative jump and a field indicating which of these two should be executed.

The relative jump instruction may be conditional. In that case, the relative jump instruction specifies or implies a condition, for example the condition that the result of the preceding command executed by the execution stage 18 was zero, or greater than zero etc. The instruction decoder 16 outputs this condition to the jump counter 19. The jump counter 19 loads the field only if the execution stage 18 outputs a status code matches the condition. Depending on the needs of programs the instruction set may contain only the conditional version of the relative jump instruction, or both the conditional version and an unconditional version.

In addition a version of the conditional relative jump instruction may be included that specifies the condition in terms of a register, a value and a relation between the content of the register and the value that must be satisfied (the relation may be "equal", "not equal", "less than" etc. ). Alternatively two registers and a relation between the contents of those two registers can be specified. When such an instruction is encountered, the jump distance will be loaded into the jump counter only if is determined that the relation is satisfied. This sort of jumps is relatively often useful in typical programs. By providing a dedicated instruction for this sort of jump, so that no more than one instruction is needed to instruct the apparatus to execute such a jump, the total program length is reduced. The same goes for conditional jumps which specify the condition by reference to the condition code.

In addition to the relative jump instruction that specifies the jump distance in terms of a number of instructions, the instruction set may also contain "normal" jump instructions that specify the jump distance as a number of addresses to be jumped over or by means of an address of a destination location. Such normal jump instructions will generally be used for jumps over longer distances or backward jumps because for longer distances a normal jump can be executed faster than the relative jump instruction that specifies the jump distance in terms of a number of instructions. When it encounters a normal jump, the instruction decoding unit 16 will change the contents of the memory address counter 12 (connections for this are not shown because they are conventional), causing the memory 14 to start fetching from the jump destination.

In case the apparatus allows for interrupts additional measures are desirable to ensure proper execution of the relative jump instruction which specifies the jump distance in terms of a number of instructions. This is because the count of the number of instructions that still has to be jumped over is effectively part of the state of the apparatus. In case of an interrupt this count is preferably saved as part of the machine state, together with for example the contents of the program counter (in case of a conditional jump, of course, this is needed only if the condition was met). Upon return from interrupt this count will be restored, so that the desired number of instructions is not executed irrespective of whether or not an interrupt has occurred in the mean time. Alternatively, one may mask interrupts during the time that instructions are read but not executed following a relative jump instruction which specifies the jump distance in terms of a number of instructions. In this case the count need not be saved with the state of the apparatus, but of course it may take longer before an interrupt is handled.

In a further embodiment of the apparatus one may include a conditional relative jump instruction with an additional "else" field. Such an instruction specifies a condition C, and two numbers N, M. This instruction serves to indicate that either the N instructions following the jump instruction or the M instructions following those N instructions must be executed, depending on whether the condition is met. When the instruction decoder 16 encounters such an instruction, the instruction decoder 16 treats it as a relative jump instruction as described hereinbefore, except that if the condition is met and the instructions following the conditional relative jump are therefore executed, the instruction decoder 16 still counts these instructions, and when N instructions have been executed, loads the jump counter 19 with M. This type of jump is needed relatively often and by including a single instruction that codes for all the required jumps, the required program length can be reduced.

In another embodiment of the apparatus one may include a loop instruction. Such an instruction specifies a condition C, and a number of instructions N. This instruction serves to indicate that the N instructions following the loop instruction must be executed repeatedly until the condition is met. When the instruction decoder 16 encounters such an instruction, the instruction decoder 16 counts the instructions executed following the loop instruction, and if N instructions have been executed and the condition is not met the instruction decoder 16 restores the program counter to the address of the instruction directly following the loop instruction. This type of jump is needed relatively often and by including a single instruction that codes for all the required jumps, the required program length can be reduced.

In case a jump to subroutine instruction is located following an "if then else" instruction or a "loop" instruction which specify the jump distance in terms of a number of instructions, the count of the number of instructions that still has to be executed before the M instructions or before the end of the loop is preferably saved with other state information that is saved in response to a jump to subroutine instruction, such as the content of the program counter. On return form subroutine, this count is restored so that the desired number of instructions following the jump to subroutine instruction is executed, no matter how many instructions the apparatus executes during execution of the subroutine.

To reduce the average size of instructions even further, one may provide for a basic instruction decoder 16 which can decode a basic instruction set which leaves a number of relatively short instruction opcodes to be defined by the application (by relatively short is meant that these relatively short opcodes are not longer than the average basic instruction opcode). Thus, the basic instruction set will contain instructions that have opcodes like LD (load) ST (store) AD (add) etc. and at least one of undefined opcode ASI (ASI2, . . . etc.). The opcode does not have a predefined length so any number of new opcodes can be defined which start with this undefined opcode.

These relatively short instruction codes are given meaning dependent on the application for which the apparatus is to be used. Once an application is selected, often occurring instructions or combinations of instructions are selected and assigned to the relatively short ASI instruction opcodes. The information needed by the instruction decoder 16 to execute these relatively short ASI instructions is loaded (permanently using for example an ASIC, PLAs, PROM or ROM or semi-permanently using EPROM) into the apparatus. In this case, the program loaded into the memory 14 may contain these relatively short instruction codes and when the instruction decoder 16 encounters such an opcode it will execute the corresponding instruction according the loaded information.

Preferably, the information needed to execute such ASI instructions is stored in the same memory as the instructions themselves and loaded each time such an ASI opcode is encountered. In this way the number of variable design parameters of the apparatus is minimized. This makes it easier to include the apparatus as a building block in IC designs.

The apparatus shown in FIG. 1 is preferably implemented in a single integrated circuit chip device including the memory 14, for example as a read only memory (ROM). In this case the invention is especially advantageous, because it helps to reduce the overall size of the chip by reducing the size of the necessary ROM and the power consumption because less instruction bits need to be loaded during execution. However, the invention may also be implemented in a chip which does not contain the memory 14, or not all of the memory 14, the memory being external to the device, or in a device containing several integrated circuit chips.

What is claimed is:

1. Data processing device comprising an instruction execution unit having an instruction set with instructions of various lengths, the instruction set comprising a relative jump instruction with a field for expressing a jump distance in terms of a number of instructions to be jumped over, the instruction execution unit being arranged to read a succession of instructions, to extract said jump distance upon encountering an instance of said relative jump instruction in said succession and to execute the succession of instructions except for a set of suppressed instructions following the instance, the set of suppressed instructions consisting of the number of instructions specified by the jump distance.

2. Data processing device according to claim 1, the instruction execution unit comprising an instruction execution pipeline with at least a decoding stage and an execution stage operating in parallel for successive instructions, the instruction execution unit disabling the execution stage following execution of the instance for a number of instruction execution cycles corresponding to the jump distance.

3. Data processing device according to claim 1, wherein said relative jump instruction is a conditional relative jump instruction specifying a condition, the instruction execution unit excepting the set of instructions from execution when said condition is met, the instruction execution unit executing the set of instructions when said condition is not met.

4. Data processing device according to claim 3, the relative jump instruction containing a further field for expressing a further number of instructions, the instruction execution unit being arranged to execute the succession of instructions except for a further set of instructions following the set of instructions when set condition is not met, the further set of instructions consisting of the further number of instructions.

5. Data processing device according to claim 3, the relative jump instruction specifying a condition, the instruction execution unit repeating execution of the set of instructions until the condition is not met.

6. Data processing device according to claim 1, wherein the instruction execution unit interprets each possible contents of said field as expressing a respective number of instructions that is greater than zero.

7. Data processing device according to claim 1, the instruction execution unit comprising an instruction counter for counting instructions encountered following said relative jump instruction, the instruction unit disabling execution of said instructions following the relative jump instruction until the instruction counter indicates that the number of instructions expressed in said field has been encountered.

8. Data processing device according to claim 7, the instruction execution unit being arranged to save a content of said counter as part of context information saved in response to an interrupt, and to restore said content in the counter upon return from the interrupt.

9. Data processing device according to claim 1, the instruction execution unit being arranged to mask interrupts during the execution of said number of instructions.

10. Data processing device according to claim 1, wherein the instruction set also contains a further jump instruction expressing a jump distance in terms of a number of addresses, the instruction execution unit altering a content of an instruction memory address counter upon encountering an instance of such a further instruction.

11. Data processing device according to claim 2, wherein said relative jump instruction is a conditional relative jump instruction specifying a condition, the instruction execution unit excepting the set of instructions from execution when said condition is met, the instruction execution unit executing the set of instructions when said condition is not met.

12. Data processing device according to claim 11, the relative jump instruction containing a further field for expressing a further number of instructions, the instruction execution unit being arranged to execute the succession of instructions except for a further set of instructions following the set of instructions when set condition is not met, the further set of instructions consisting of the further number of instructions.

13. Data processing device according to claim 11, the relative jump instruction specifying a condition, the instruction execution unit repeating execution of the set of instructions until the condition is not met.

14. Data processing device according to claim 2, the instruction execution unit comprising an instruction counter for counting instructions encountered following said relative jump instruction, the instruction unit disabling execution of said instructions following the relative jump instruction until the instruction counter indicates that the number of instructions expressed in said field has been encountered.

15. Data processing device according to claim 14, the instruction execution unit being arranged to save a content of said counter as part of context information saved in response to an interrupt, and to restore said content in the counter upon return from the interrupt.

16. Data processing device according to claim 2, the instruction execution unit being arranged to mask interrupts during the execution of said number of instructions.

17. Data processing device according to claim 2, wherein the instruction set also contains a further jump instruction expressing a jump distance in terms of a number of addresses, the instruction execution unit altering a content of an instruction memory address counter upon encountering an instance of such a further instruction.

* * * * *